(12) United States Patent
Ammerlaan et al.

(10) Patent No.: US 6,237,989 B1
(45) Date of Patent: May 29, 2001

(54) VEHICLE CONSTRUCTION

(75) Inventors: Henricus Nicolaas Maria Ammerlaan, Groningen; Hendrik Jacob Hartgers, Zuidwolde; Nicolaas Gijsbert Smink, Veldhoven, all of (NL)

(73) Assignee: Fokker Special Products B.V., Hoogeveen (NL)

( * ) Notice: Subject to any disclaimer, the term of this patent is extended or adjusted under 35 U.S.C. 154(b) by 0 days.

(21) Appl. No.: 09/039,457

(22) Filed: Mar. 16, 1998

(30) Foreign Application Priority Data

Mar. 14, 1997 (NL) .................................................. 1005539
Jun. 2, 1997 (NL) .................................................. 1006199

(51) Int. Cl.$^7$ ....................................................... B60J 1/00
(52) U.S. Cl. ........................... 296/178; 296/187; 296/191; 296/193; 296/203.01; 296/29; 105/397
(58) Field of Search ..................................... 296/187, 191, 296/178, 193, 196, 197, 198, 203.01, 29, 30; 105/397, 401, 395

(56) References Cited

U.S. PATENT DOCUMENTS

| 3,100,458 | | 8/1963 | Baker et al. . | |
|---|---|---|---|---|
| 4,033,033 | * | 7/1977 | Heffner ................................. | 29/824 |
| 4,469,369 | * | 9/1984 | Belik et al. ........................... | 296/197 |
| 4,542,933 | * | 9/1985 | Bischoff ................................ | 396/164 |
| 5,042,395 | | 8/1991 | Wackerle et al. . | |
| 5,362,345 | * | 11/1994 | Stettler et al. ....................... | 105/397 |
| 5,433,151 | * | 7/1995 | Ohara et al. ......................... | 105/397 |
| 5,601,034 | * | 2/1997 | Tao et al. ............................. | 105/397 |
| 5,632,521 | * | 5/1997 | Archambault ....................... | 296/65.1 |
| 5,669,999 | * | 9/1997 | Anderegg et al. ................... | 105/397 |
| 5,797,646 | * | 8/1998 | Jeunehomme et al. .............. | 296/197 |
| 5,857,414 | * | 1/1999 | Thoman et al. ..................... | 105/397 |
| 5,921,578 | * | 7/1999 | Sekita et al. ......................... | 280/788 |

FOREIGN PATENT DOCUMENTS 88 07 208   9/1988   (DE) .
0 687 612   12/1995  (EP) .

* cited by examiner

Primary Examiner—Joseph D. Pape
Assistant Examiner—Lori L. Coletta
(74) Attorney, Agent, or Firm—Young & Thompson

(57) ABSTRACT

A vehicle construction includes a body with a base, a roof, two longitudinal walls joining the base and the roof and at least four wheels connected to the base, which base, roof and longitudinal walls comprise sandwich panels which are jointed to one another at their longitudinal edges. The thickness of the sandwich panel forming the base is of the same order of magnitude as the thickness of the roof or sandwich panel forming a longitudinal wall and the sandwich panels of base, roof and longitudinal walls form a bending- and torsion-resistant tube.

17 Claims, 6 Drawing Sheets

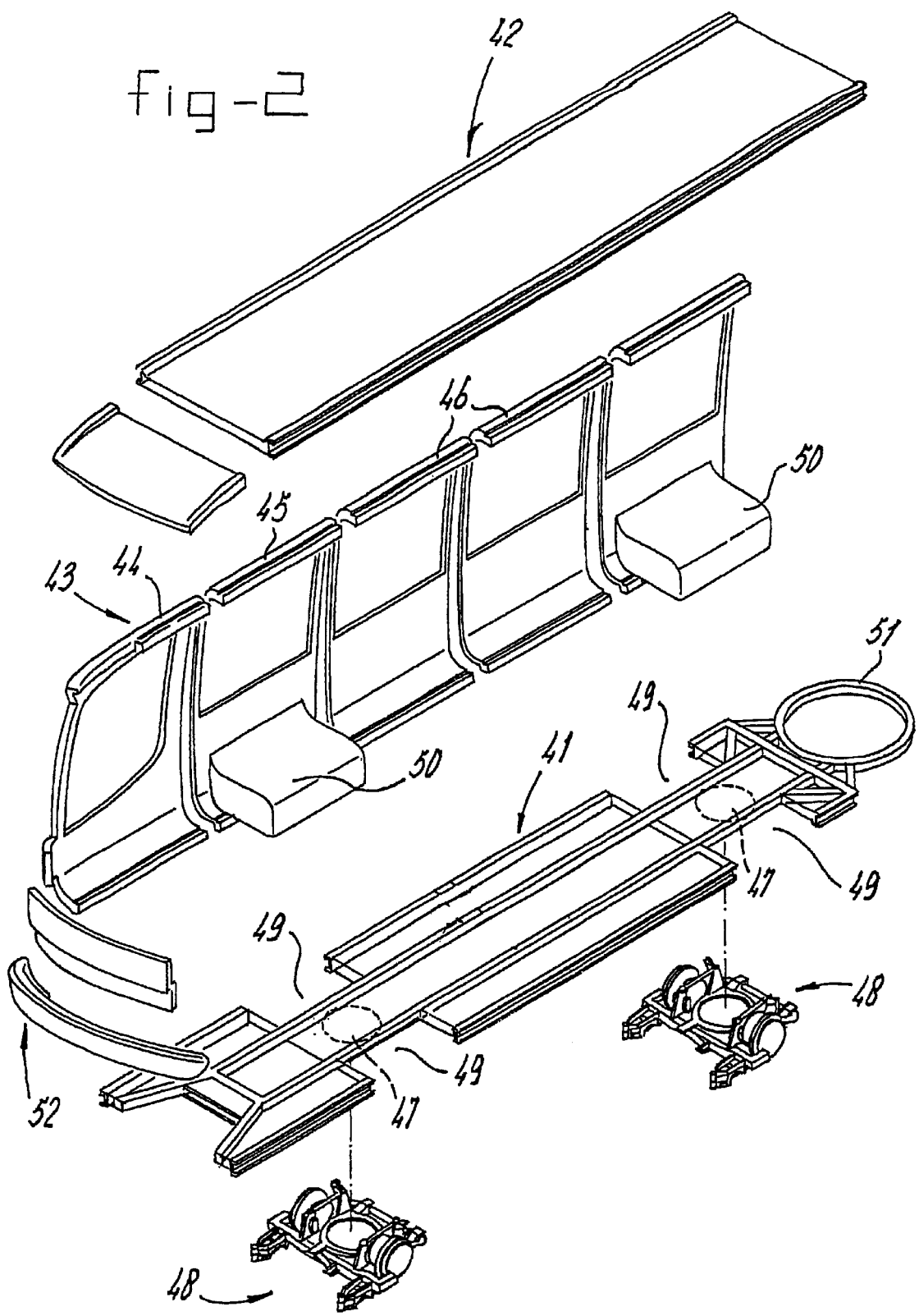

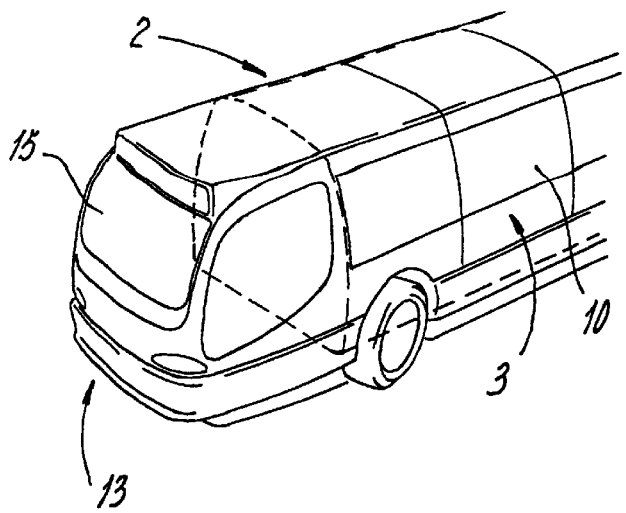
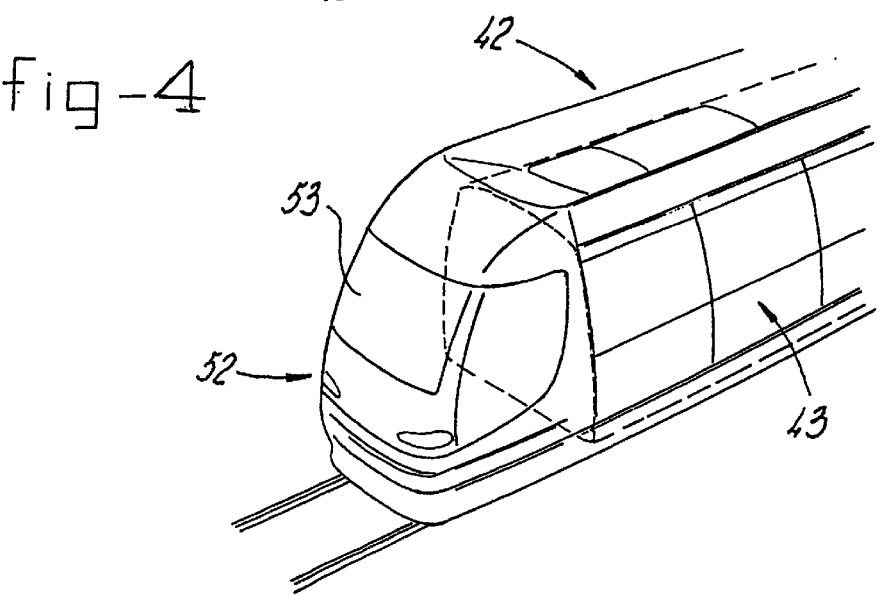
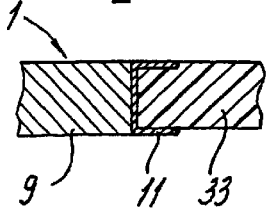
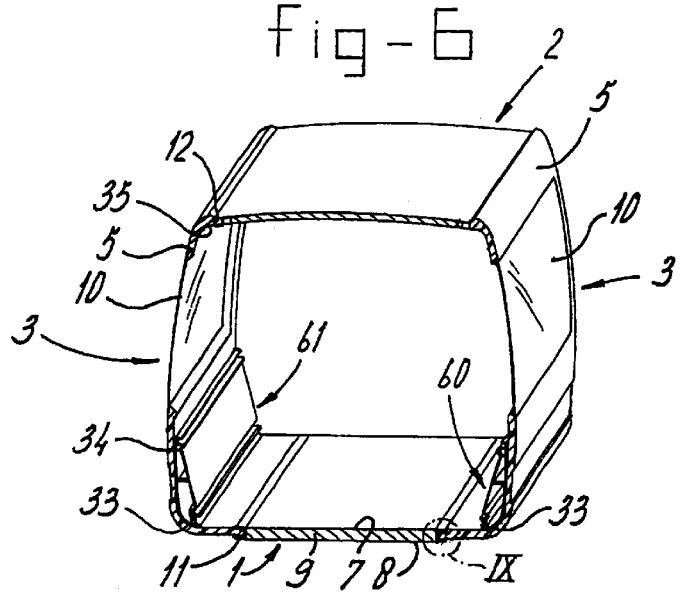

VEHICLE CONSTRUCTION

BACKGROUND OF THE INVENTION

The invention relates to a vehicle construction comprising a body with a base, a roof, two longitudinal walls joining the base and the roof and at least four wheels connected to the base, which base, roof and longitudinal walls comprise sandwich panels which are jointed to one another at their longitudinal edges.

A vehicle construction of this type, constructed as a rail vehicle, is disclosed in FR-A 2 704 507. The body of this known vehicle is positioned on a fairly high base construction, which base construction consists of a sheet of sandwich material which has longitudinal reinforcements on its underside, in the region between the two bogies.

The known vehicle construction has the disadvantage that the floor thereof is at a high level, which depends on the height of the longitudinal reinforcements beneath the baseplate. A construction of this type is not suitable for vehicles which are intended for short distance transport, for example local transport. For transport of this type it is important to facilitate entry and alighting as far as possible, tow which end as low as possible a floor is preferably used.

A relatively low, flat loading deck is already used in vehicles of conventional construction, that is to say vehicles with a normal chassis of steel girders with a super-structure of lattice construction mounted thereon. However, said vehicles lack the advantage which the construction using sandwich panels provides, such as a low mass and modular construction, which makes possible variations in the design and size of the vehicles. Moreover, the fuel consumption is high as a consequence of the relatively heavy construction.

SUMMARY OF THE INVENTION

The aim of the invention is, therefore, to provide a vehicle construction of the abovementioned type which, on the one hand, has the advantages of a sandwich construction, such as lower mass, and which, on the other hand, nevertheless offers a low, float loading deck. Said aim is achieved in that the thickness of the sandwich panel forming the base is of the same order of magnitude as the thickness of the roof or sandwich panel forming a longitudinal wall and in that the sandwich panels of base, roof and longitudinal walls form a bending- and torsion-resistant tube. Such a tube is self-supporting and does not require a separate supporting frame.

With the self-supporting vehicle construction according to the invention the required rigidities are supplied by the panels which act together as a tube. That is to say, flexural stresses in the longitudinal direction are taken up by both the roof and the base. The advantage of this is that the base does not have to take up the entire bending moment, as a consequence of which the thickness of the baseplate can remain restricted to the same order of magnitude as the thickness of the sandwich panel concerned.

Furthermore, a sandwich floor construction makes it possible to achieve a flat floor over a substantial length of the vehicle, With conventional designs this flatness is restricted to a few meters. As a result it is possible, for example, to give a 10 meter bus the same transport capacity as a conventional 12 meter bus.

The floor of the vehicle, which deck is completely free from reinforcing ribs and the like projecting downward from the underside, can consequently be located at a low height above the road. The vehicle construction according to the invention is thus outstandingly suitable for local transport, such as a tram or bus, since with this construction the advantage of a relatively low weight (advantageous in connection with frequent braking and pulling away from stops) is combined with a low entry height.

In particular, the thickness of the sandwich panel forming the base can be between 1.5 and 2.5 times as great as the thickness of the sandwich section forming the roof.

Preferably, the thickness is approximately twice as great as the thickness of the sandwich section forming the roof.

As is known, a sandwich construction is particularly suitable for absorbing distributed stresses which are not generated as concentrated point or line stresses. A construction of this type can also certainly be stressed in its plane; on absorption of stresses perpendicular to its plane, separate measures must be taken which make it possible for gradual introduction of such stresses.

In this context the sandwich panels forming the longitudinal walls can, according to a further improvement, be integrally extended at their underside by an essentially horizontal base strip, the base strips being fixed to the longitudinal edges of the sandwich panel which forms the remainder of the base.

In contrast to the vehicle construction disclosed in FR-A 2 704 507, there is no stress concentration in the corner join between longitudinal walls and base. Especially in the case of a fully laden deck, the bending moments in the transverse direction at the location of such a corner join can give rise to high stresses, which must be absorbed by supplementary frame components.

Preferably, the transverse dimension of each strip and of the sandwich panel joined thereto are chosen such that under nominal stress the bending moments, viewed in the transverse direction, are minimal at the location of the join between strips and base panel.

The join between said parts is consequently subjected to hardly any flexural stress, with the advantage that lightweight edge sections which are integrated in the sandwich panels can suffice at this join.

As has been stated, the base of the vehicle construction according to the invention can be located at a low height above the road. The entry and alighting height can be kept as low as possible if recesses to accommodate wheels are provided in the sandwich panels forming the base and the longitudinal walls, one wheel housing being fixed to the edge of each of said recesses. Moreover, the vehicle can be equipped with conventional wheelchair access installations.

Said wheel housings are preferably likewise made of a sandwich material. The tube construction of the body remains closed as a result, such that the wheel recesses produce virtually no weakening.

The support points for the wheel suspension are integrated in the sandwich panel forming the base.

The suspension points for wheels and power source consist of mounting plates with a rubber bearing, which mounting plates are each surrounded by and are fixed to reinforcing sections which are incorporated in the sandwich panel of the base. The supporting forces provided by the wheels can thus be transmitted uniformly into the baseplate, such that the sandwich construction is able to transmit these stresses in an optimum manner.

The sandwich panels forming the base, the roof and/or a longitudinal wall can carry fixing sections on their longitudinal edges facing one another, by means of which fixing sections said sandwich panels are fixed two by two.

The longitudinal walls may consist of mutually connected wall modules. The length of the longitudinal walls may be adapted easily thereby, dependent from the vehicle length. Moreover, damaged parts may be replaced in a convenient way.

BRIEF DESCRIPTION OF THE DRAWINGS

The invention will be explained in more detail below with reference to a few illustrative embodiments shown in the figures.

FIG. 2 shows a corresponding view of a tram construction.

FIG. 3 shows a perspective view of the finished bus construction.

FIG. 4 shows a corresponding view of the finished tram construction

FIG. 6 shows a partial perspective and cross-sectional view of the bus construction.

FIG. 9 shows detail IX according to FIG. 6.

DESCRIPTION OF THE PREFERRED EMBODIMENTS

Figure 1:
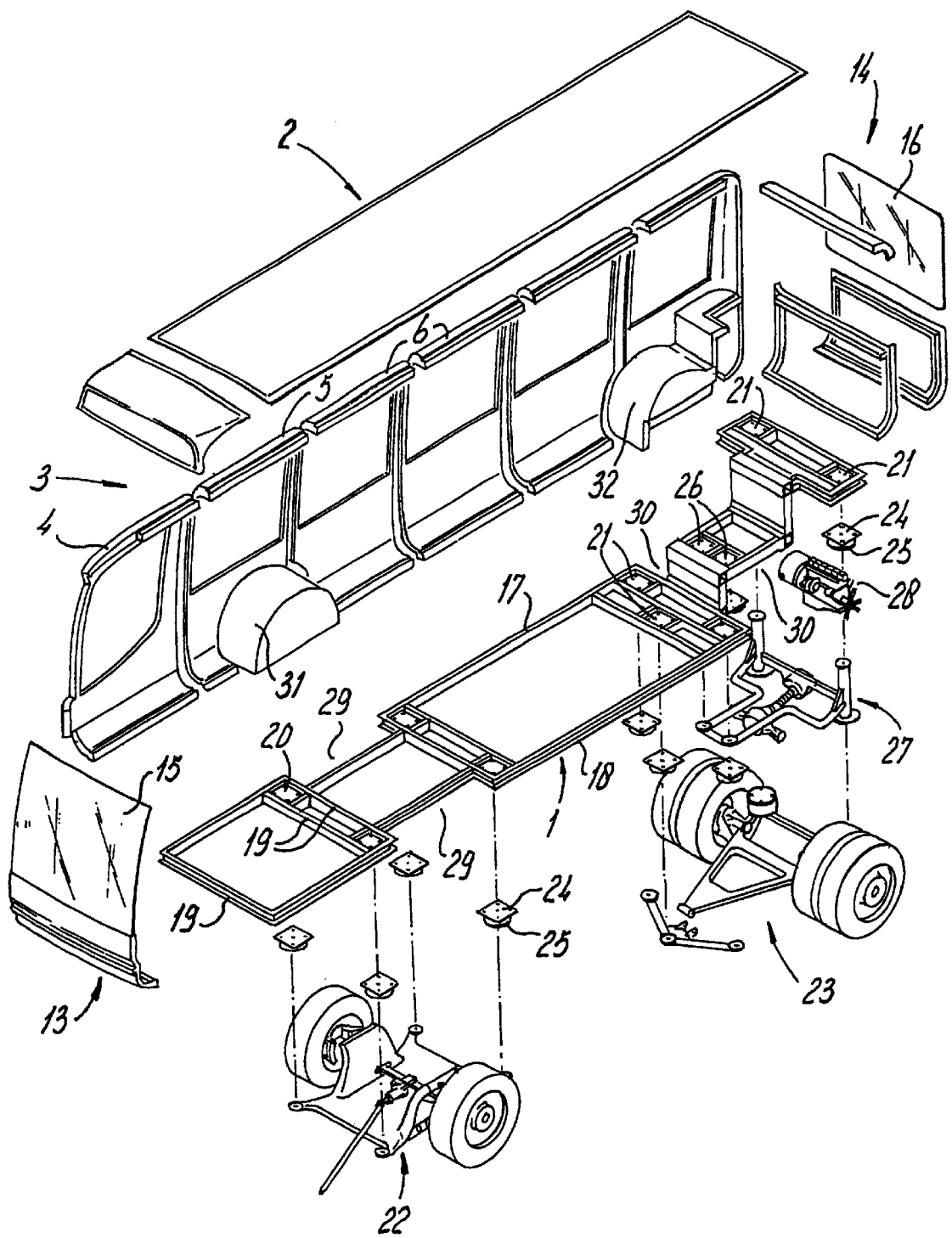
FIG. 1 shows a (partial) exploded view of a bus construction according to the invention.

The bus construction shown in FIGS. 1 and 6 comprises a base 1, roof 2 and two longitudinal walls 3, which consist of modules 4, 5, 6, each constructed as a sandwich panel. Each of the base 1, roof 2, and walls 3 is made up of two skins 7, 8, between which a core material 9 is incorporated. For the base 1 and the roof 2, the skins can, for example, be made of aluminium, the panels for the longitudinal walls 3 can, for example, comprise skins of glass fibre-reinforced material.

Windows 10 are glued into the longitudinal walls 3 in a known manner, such that the longitudinal walls 3 have a sufficiently high shear resistance, despite the large openings.

As can be seen in FIGS. 6–9, the longitudinal walls 3 are fixed to the base 1 and, respectively, the roof 2 at their longitudinal edges by means of integral fixing sections 11, 12.

The sandwich panels forming the longitudinal walls (3, 43) may be integrally extended at their underside by an essentially horizontal base strip (33), the base strips (33) being fixed to the longitudinal edges of the sandwich panel which forms the remainder of the base (1, 41). Further, the sandwich panels forming the longitudinal walls (3, 43) may be integrally extended at their top by an essentially horizontal roof strip (35), the roof strips (35) being fixed to the longitudinal edges of the sandwich panel which forms the remainder of the roof (2).

As can be seen in FIG. 1, the body of the bus construction is completed by a front wall 13 and rear wall 14, which contain, inter alia, a windscreen 15 and, respectively, a rear window 16. Said front wall 13 and rear wall 14 can also be fixed at their edges to the longitudinal walls 3 and, respectively, the base 1 and the roof 2, such that the finished body construction has an appreciable rigidity with respect to torsion and bending.

Figure 5:
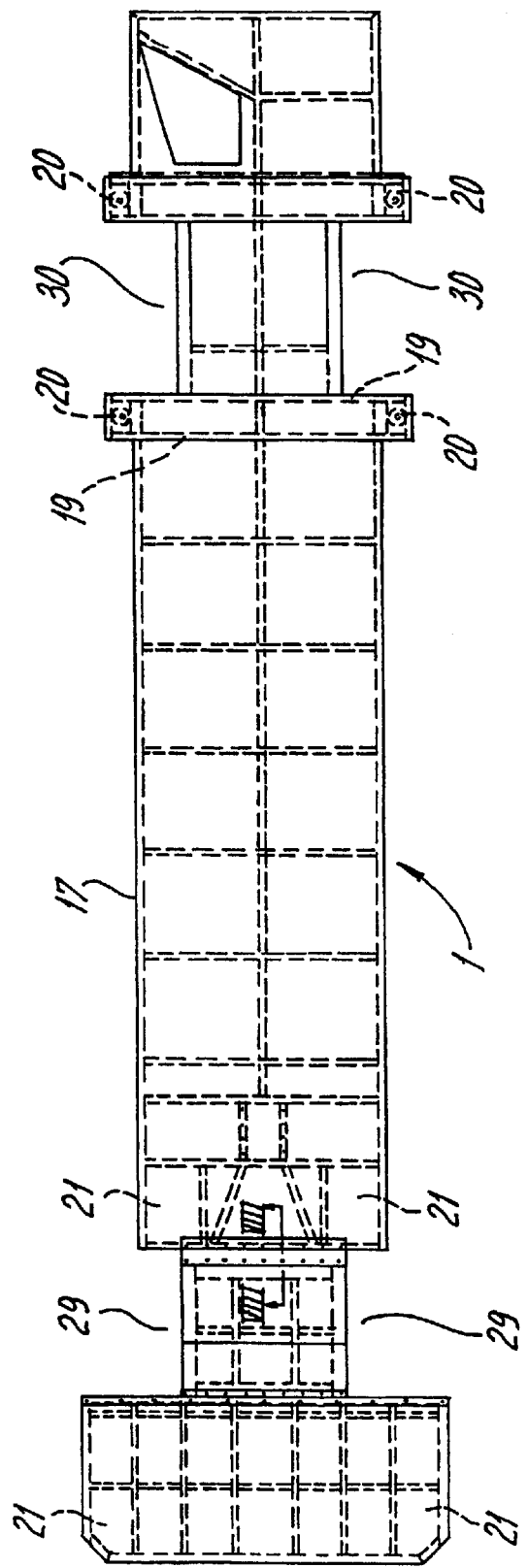
FIG. 5 shows a top view of that sandwich panel of the bus construction which forms the base.

As is shown in FIGS. 1 and 5, the baseplate has integral fixing sections 17, 18 which run in the longitudinal direction. Furthermore, a number of integral fixing sections 19 which run in the transverse direction are provided.

Fixing sections of this type can also have been fitted in the sandwich panels forming the roof 2 and the sandwich panels forming the side walls 3.

A number of suspension points 20 for the front wheel assembly 22 and a number of suspension points 21 for the rear wheel assembly 23 are arranged between said integral fixing sections 17–18. Said wheel assemblies are fixed to the suspension points 20 and 21, respectively, by means of mounting plates 24, each of which has a rubber bearing 25, by which mean vibration-free support of the body construction is ensured.

Suspension points 26 and support 27 which carry the power source 28 and the transmission are also accommodated in the sandwich panel forming the base 1.

At its rearmost end, the sandwich panel 1 forming the base is constructed such that it rises stepwise, in such a way that space is created for the power source 28. This construction is entirely dependent on the type of drive to be installed. This construction is generic to such an extent that various drive lines are simple to attach.

The sandwich panel 1 forming the base is flat on its underside, such that the floor surface, as defined by said panel 1, can be located at a low level. In this context, recesses 29, 30 are made in said panel in order to create space for the wheels. Corresponding recesses are also made in the longitudinal walls 3. Said recesses are closed off by means of wheel housings 31, 32, which preferably are also made of sandwich material, in such a way that a complete body construction having the requisite flexural and torsional rigidity is obtained.

The tram construction shown in FIGS. 2 and 4 in principle corresponds o the bus construction shown in the other figures. Said tram construction consists of a sandwich panel 41, forming the base, and sandwich panel 42, forming the roof, as well as longitudinal wall modules 44, 45 and 46, which form the longitudinal walls 43.

The base 41 is provided with suspension points 47 to which the live ring of bogies 48 is fixed.

Here again the baseplate 41 is provided with recesses 49 to accommodate the wheels (not shown) of the live rings 48, as a result of which the floor of the base 1 can remain at a low level.

The wheel housings 50 cover the recesses 49 in the base 41 and corresponding recesses in the longitudinal walls 43.

The base 41 is also provided with a turntable 51 for coupling up to a further rail vehicle.

The front of the rail vehicle is closed by means of a front wall 52 consisting of rigid panels and a windscreen 53.

Figure 7:
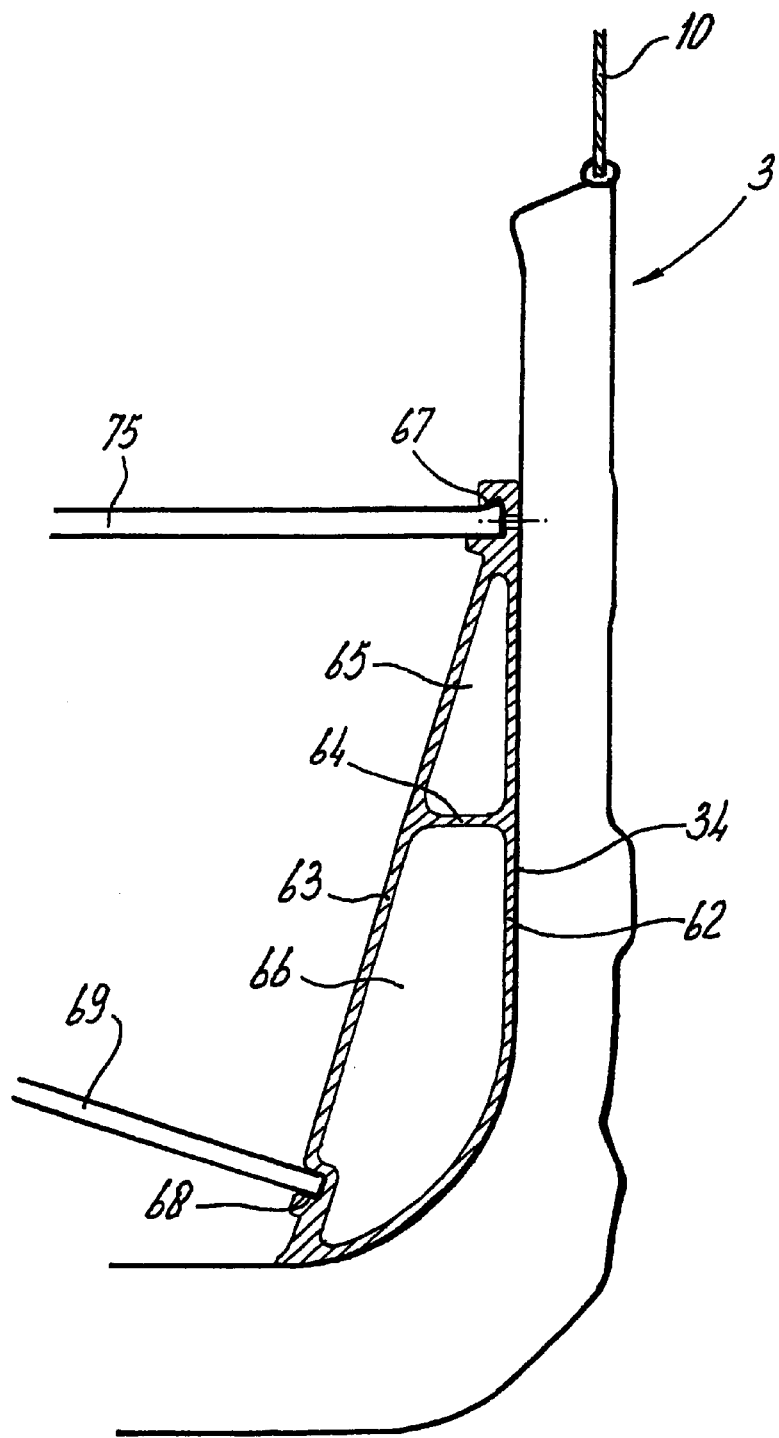
FIG. 7 shows a detail of the body.

FIG. 6 also shows two seat rails 60, 61, one of which is also shown in cross-section in FIG. 7. Each seat rail 60, 61 has an outside 62 shaped correspondingly to the contour of longitudinal wall 3, in particular the contour of the base strip 33 the wall strip 34 adjoining the latter, and a sloping inside 63. The interior space enclosed between the sides 62, 63 is divided into two hollow spaces 65, 66 by means of partition 64.

The seat rail 60, 61 is fixed to walls 3 and forms a rigid element from which the seats can be suspended. To this end the seat rail has two longitudinal slots 67, 68. The upper longitudinal slot 67 is undercut, such that rod 75 of a seat frame can be hooked therein and can be retained against tensile forces.

The lower longitudinal slot absorbs the compressive forces from rod 69 of the seat frame.

The seat rails 60, 61 thus absorb the concentrated forces generated by the local points of engagement of the rods 75, 69 of the seat frames and transmit these, uniformly distributed, to the longitudinal wall 3.

Figure 8:
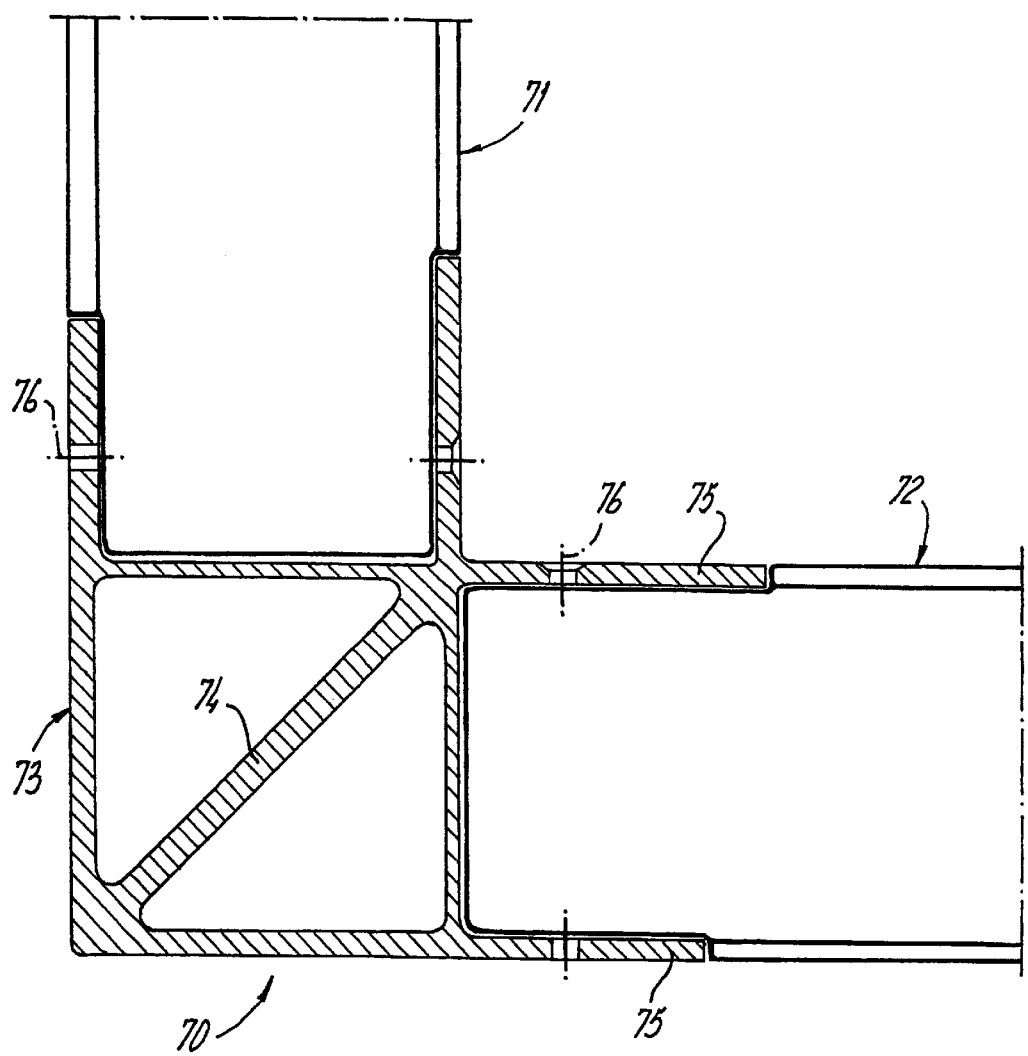
FIG. 8 shows detail VIII—VIII according to FIG. 5.

The cross-section shown in FIG. 8 shows the linking section 70 in that part of the sandwich panel 1 which rises stepwise, which linking section joins the horizontal panel section 72 to the vertical panel section 71.

To transmit the stresses between said sections 71, 72, the section has tubing 73 which is divided by partition 74 into two areas of triangular cross-section. Said triangular shapes provide high rigidity, without the wall thicknesses of linking section 70 having to be too high.

The section 70 also has flanges 75, between which the panel sections 71, 72 can be accommodated and fixed by means of bolts or pins 76.

What is claimed is:

1. A vehicle construction, comprising:
   a body with a base, a roof, and two longitudinal walls joining said base and said roof;
   plural wheels connected to said base,
   said base, roof and walls comprising sandwich panels that are joined to one another at their longitudinal edges forming a bending and torsion resisting tube,
   a thickness of the sandwich panel of said base being of the same order of magnitude as a thickness of at least one of (a) the sandwich panel of said roof and (b) the sandwich panels of the walls,
   each of said longitudinal walls comprises plural said sandwich panels that are joined to one another at lateral edges and joined to respective sandwich panels of said roof and said base at longitudinal edges; and
   seat rails fixed along said longitudinal walls and said base, each said seat rail being a closed section with an outside matched to a contour of the corresponding said longitudinal wall and base and a sloping inside.

2. The construction of claim 1, wherein each of said sandwich panels of said longitudinal walls has an integrally and longitudinally extended edge strip that is adjacent to and generally coplanar with said roof, the respective edges of said roof and said longitudinal walls that are joined to one another being generally perpendicular to a plane of said roof.

3. The construction of claim 1, further comprising U-shaped fixing sections at the longitudinal edges of said base.

4. A vehicle construction, comprising:
   a body with a substantially horizontal base, a substantially horizontal roof, and two longitudinal walls joining said base and said roof; and
   plural wheels connected to said base,
   said base, roof and two longitudinal walls each comprising sandwich panels that are joined to one another at their respective longitudinal edges,
   a bottom portion, adjacent to said base, of each of said sandwich panels of said two longitudinal walls being curved to define respective substantially horizontal base strips that integrally extend said sandwich panels of said longitudinal walls horizontally at their respective bottoms, said substantially horizontal base strips joining said base.

5. Vehicle construction according to claim 4, wherein recesses (29, 30, 49) to accommodate wheels are provided in the sandwich panels forming the base (1, 41) and the longitudinal walls (3, 43), one wheel housing (31, 32, 50) being fixed to the edge of each of said recesses.

6. Vehicle Construction according to claim 5, wherein the wheel housings (31, 32, 50) are made of a sandwich material.

7. Vehicle construction according to claim 4, further comprising suspension points (20, 21, 47) for wheel suspension that are integrated in the sandwich panel forming the base (1, 41).

8. Vehicle construction according to claim 7, wherein the suspension points (20, 21, 47, 26) for wheels comprise mounting plates (24) having a rubber bearing (25).

9. Vehicle construction according to claim 4, wherein the sandwich panel forming the base (1) is constructed such that it steps upwards at the rear, which upward stepping rear is provided with integral suspension points (21, 26) for a power source (28) to drive the rear wheels.

10. Vehicle construction according to claim 9, wherein the upward-stepping rear of the sandwich panel forming the base (1) has corners provided with flanges (75), between which panel sections (71, 72) are fixed.

11. Vehicle construction according to claim 10, wherein the corners have tubing (73) which is divided by a partition (74) into two spaces of essentially triangular cross-section.

12. Vehicle construction according to claim 4, wherein seat rails (60, 61) are fixed along the longitudinal walls (3, 43) and base (1, 41).

13. Vehicle construction according to claim 12, wherein each seat rail (60, 61) is a closed section having an outside (62) matched to the contour of longitudinal wall (3, 43) and base (1, 41) and a sloping inside (63).

14. Vehicle construction according to claim 13, wherein longitudinal slog (67, 68) are provided on the inside (63) to accommodate rods (75, 69) of a seat frame.

15. The construction of claim 4, wherein each of said longitudinal walls comprises plural said sandwich panels that are joined to one another.

16. The construction of claim 4, wherein a thickness of the sandwich panel of said base is between 1.5 and 2.5 times as great as a thickness of at least one of (1) the sandwich panel of said roof and (b) the sandwich panels of the walls.

17. The construction of claim 4, further comprising U-shaped fixing sections at the longitudinal edges of said base.

* * * * *